Feb. 24, 1953 R. S. BAILEY 2,629,818

HIGH SELECTIVITY RECEIVER

Filed March 17, 1949 2 SHEETS—SHEET 1

INVENTOR
ROBERT S. BAILEY
BY R P Morris
ATTORNEY

HIGH SELECTIVITY RECEIVER

Filed March 17, 1949 2 SHEETS—SHEET 2

INVENTOR
ROBERT S. BAILEY
BY R P Morris
ATTORNEY

Patented Feb. 24, 1953

2,629,818

UNITED STATES PATENT OFFICE 2,629,818

HIGH SELECTIVITY RECEIVER

Robert S. Bailey, New York, N. Y., assignor to International Standard Electric Corporation, New York, N. Y., a corporation of Delaware Application March 17, 1949, Serial No. 81,871

4 Claims. (Cl. 250—20)

This invention relates to radiant energy translating circuits and more particularly to radio receivers having a high selectivity.

It has heretofore been impossible to obtain a high selectivity in radio receivers of the type which successively recycle the received signal energy in the form of pulses for the purpose of achieving the various successive translations and amplifications thereof. This was due to the fact that the frequency of repetition of the recycling step, that is the inherent pulsing of the circuit required excessive band widths. Thus, for example, for a receiver which is required to reproduce an 8,000 cycle audio signal, the pulsing of recycling repetition frequency must be of the order of 25 kc. in order that an 8,000 cycle wave may be faithfully reproduced from the pulsed output wave. If it is assumed that the 10th harmonic of the pulse repetition frequency must be passed in order to keep the pulse sharp, a band width of 500 kc. must be provided in any circuit through which these pulses pass inasmuch as two sidebands each 250 kc. wide occur. It becomes obvious, therefore, that if the intermediate frequency amplifier of a receiver must have a 500 kc. pass band its selectivity will be so poor that it cannot be used on the broadcast band without special ameliorating devices.

It is an object of this invention to provide a radio receiver circuit which overcomes the above-stated difficulties.

It is another object to provide a radio receiver of the above-mentioned type which employs a signal energy reiterating system wherein a given signal is repeatedly circulated through an amplifier for the purpose of amplification.

A further object is the provision of an improved circuit wherein a plurality of different operations such as amplification of the intermediate frequency and audio frequency are performed successively by the same energy translation device or stage, whereby the amount of apparatus required to produce a desired result is minimized.

A still further object of this invention is to provide an improved method and means for segregating the signal intelligence frequencies from the radio frequency carrier making use of the signal recycling or reiterating amplifier circuit whereby a high selectivity reiterative receiver is obtained.

In accordance with certain features of this invention, I provide a circuit for the reception of an audio frequency modulated radio frequency carrier. The received carrier is mixed with energy from a local oscillator operating at a frequency which is half that of the carrier. The resulting output frequency is then equal to the oscillator frequency if subtractive mixing is employed. The resulting intermediate frequency energy is reiteratively amplified emerging with side bands due to the cyclic or pulsating nature of the amplifier. The amplified output is mixed a second time with the oscillator frequency. It now becomes evident that the modulation side bands of the carrier frequency will appear as audio frequencies and that the side bands due to the recycling frequency will appear as super-audible frequencies which may be eliminated from the final output in the usual manner.

In accordance with another feature of this invention, the second mixing stage may be dispensed with by using the reiterative translator both as an intermediate and as an audio amplifier, the intermediate frequency being fed back from the amplifier to the mixer stage, filtered for the intelligence components and reiteratively amplified in the recycling translator. Suitable filters may, of course, have to be used.

While I have outlined above the general objects and features of my invention, a better understanding of these and other objects, advantages and features will become apparent from the particular description of a few embodiments thereof made with reference to the accompanying drawings in which.

Figure 1:
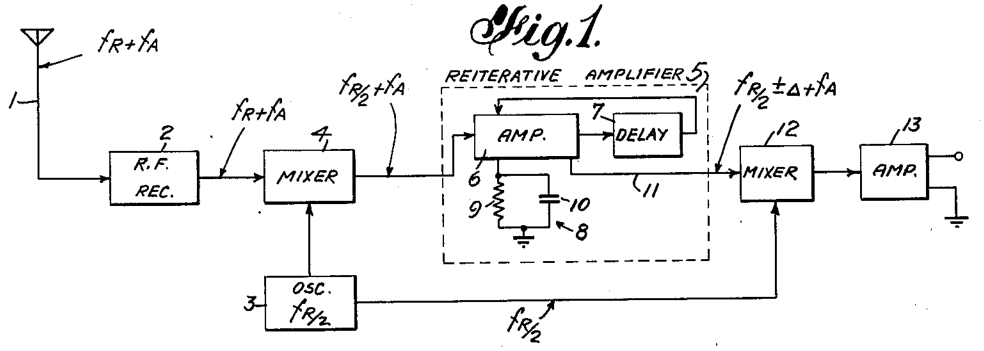
Fig. 1 is a block diagram of a radio receiver embodying my invention.

Referring now to the receiver shown in Fig. 1, the incoming signal, which may, for the purpose of illustration, be an amplitude modulated radio frequency transmission, will be received by a suitable radiation responsive device such as an antenna 1. In accordance with conventional practice the antenna 1 feeds into a radio frequency receiver 2 such as suitable tuned circuits and an amplifier if necessary. In order to convert the radio frequency to an intermediate frequency a local oscillator 3 which supplies energy at a frequency which is one-half of the incoming radio frequency has its output combined subtractively with the received radio frequency energy in a mixing device 4. The resulting output frequency of the mixture 4 is thence fed through a so-called reiterative amplifier circuit 5. Reiterative circuits, that is circuits which are adapted to successively recycle energy supplied to them at a given repetition rate for the purpose of translation thereof, such as amplification which otherwise would require separate and successive translational stages, have been described in connection with various functions in my co-pending application S. N. 55,856/48, filed October 22, 1948, and in the co-pending applications S. N. 667,318, filed April 26, 1946, and S. N. 698,484, filed September 21, 1946, Patent No. 2,597,029, granted May 22, 1952. The reiterative amplifier 5 may accordingly take a number of suitable forms as required and will here be described for purposes of illustration only. Thus, it is in this instance comprised of an amplifier 6 which supplies a delay line 7. The delay device 7 is connected to feed back into the amplifier 6 the energy received therefrom. The constants of the device 7 determine the reiteration or pulse repetition frequency of the system. The number of reiterations or recyclings may for instance be determined by a biasing circuit for the amplifier 6, such circuit being indicated at 8. The circuit 8 may for example, comprise resistance 9 connected to ground and shunted by a capacity 10; the constants of this circuit may be such that after a suitable number of reiterations the capacity 10 will have become charged to such an extent as to render the amplifier 6 inoperative. Other devices may be employed for this purpose, as disclosed for example in the above-mentioned co-pending applications, in accordance with respective needs. The output of the amplifier 6 obtained over a connection 11 is mixed a second time with the output of the oscillator 3 in a mixing circuit 12. The resulting frequencies are finally amplified in audio amplifier 13 wherefrom audio signal energy may be supplied to any desired utilization device such as a loud speaker.

An operational analysis reveals that if the incoming signal is of the form $f_R \pm f_A$, that is a radio frequency carrier $f_R$ modulated with an audio frequency $f_A$, a subtractive mixing with the frequency $f_{R/2}$ of the oscillator 3 results in an intermediate frequency $f_{R/2} \pm f_A$. This intermediate frequency obtained after elimination of the upper side band (as by a suitable filter which may be part of the mixer circuit 4) is subjected to reiterative amplification in the circuit 5 and, due to the cyclical or pulsating nature of the amplifier emerges therefrom in a form substantially given by the expression $f_{R/2} \pm \Delta f_A$, signifying that the resulting frequency contains side bands $\Delta$ due to the repetition frequency of the circuit 6 which is in the super audible range. After being mixed again with the output of the oscillator 3, the first order modulation side bands of the frequency $f_{R/2}$ will appear as audio frequencies, and the repetition frequency side bands will appear as super audible frequencies to which the subsequent translation circuits are not responsive, whereby the desired audio signal will be isolated. It is clear, therefore, that if conventional detection of the output of the reiterative amplifier had been used, all the side bands together with their modulation would have appeared in the output without any appreciable selectivity.

Figure 2:
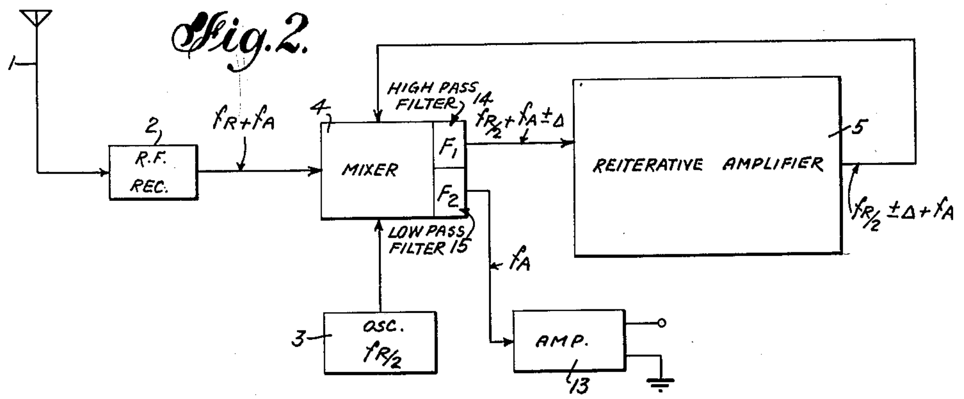
Fig. 2 is a block diagram of a receiver in accordance with the invention somewhat simplified in respect to the form of Fig. 1.

Referring now to Fig. 2, there has been illustrated a circuit including block units similar to those of Fig. 1 and referred to by the same general reference characters, except that in this case the mixer 4 serves for both mixing operations, the mixer 12 of Fig. 1 having been omitted with a consequent saving in electron tubes. This is accomplished by feeding the reiteratively amplified energy back into the mixer 4 and there effecting the second mixing step in order to isolate super audio and audio frequency components. The mixer in this case may include high pass and low pass filter circuits 14 and 15 respectively for the purpose of passing the intermediate and the audio components after the first and the second mixing steps respectively.

Figure 3:
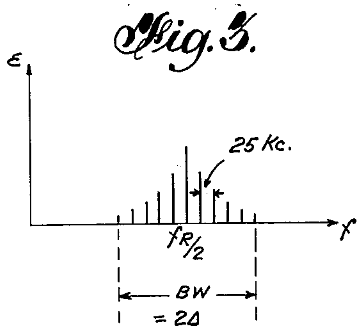
Fig. 3 is a graphical illustration of the characteristic frequency spectrum of the reiterative amplifier used in the circuits of Figures 1 and 2.

In Fig. 3 there is graphically indicated an illustrative frequency spectrum of the output of the reiterative amplifier. A number of frequency components have been shown symmetrically arranged about a median frequency equal to one half of the carrier frequency $f_R$. The separation between the adjacent components of the spectrum is equal to the pulse repetition frequency of the system used which may be for example 25 kc. The amplitude of the spectrum components is a function of the width of the repetition pulse used in the reiterative amplifier.

Figure 4:
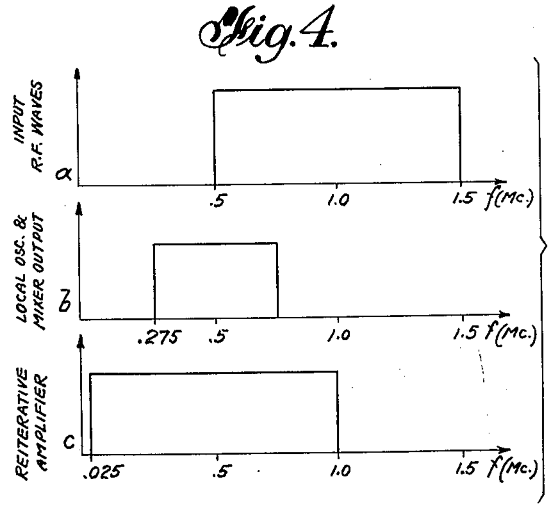
Fig. 4 is a graphical illustration of the band width characteristics for the receiver according to the invention as applied to the broadcast band.

The three graphs of Fig. 4 show the respective band width requirements of a receiver in accordance with the invention as applied to a broadcast band. Thus the graph (*a*) shows the range of the radio frequency signal carrier wave. Graph (*b*) is illustrative of the heterodyning oscillator frequencies for accommodating the band of graph (*a*). Graph (*c*) shows the band width required in the reiterative amplifier, assuming a 25 kc. reiteration frequency and a requirement for passing the tenth harmonic components of the reiterative pulsation.

Figure 5:
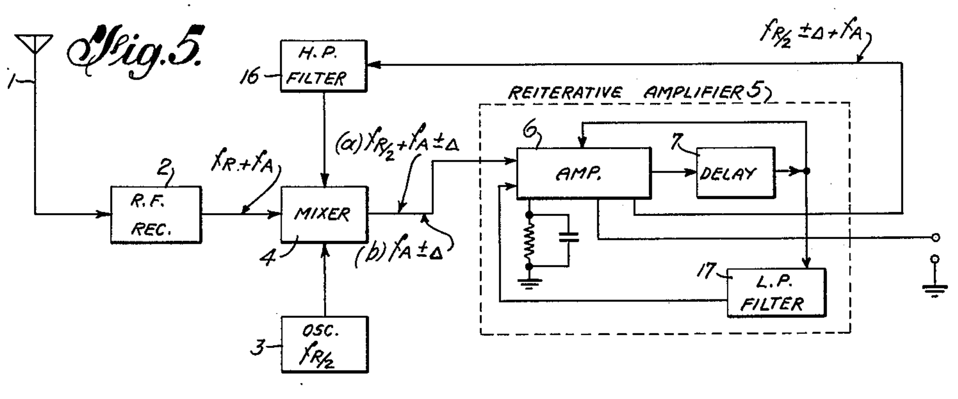
Fig. 5 is a block diagram of another form of the receiver.

Fig. 5 illustrates a radio receiver employing a reiterative amplifier which is being utilized both as an intermediate and audio frequency amplifier, the mixer 4 serving for both of the mixing steps described in connection with the circuit of Fig. 1. The similarity of this circuit with that shown in Fig. 2 is at once apparent except that the feedback from the amplifier 6 to the mixer 4 includes a high pass filter 16 in order to pass the resulting amplified intermediate frequencies, and in that there is provided an additional feed-back from the delay device 7 to the amplifier 6 including a low pass filter 17 for the passing of the audio frequencies to be recycled.

Figure 6:
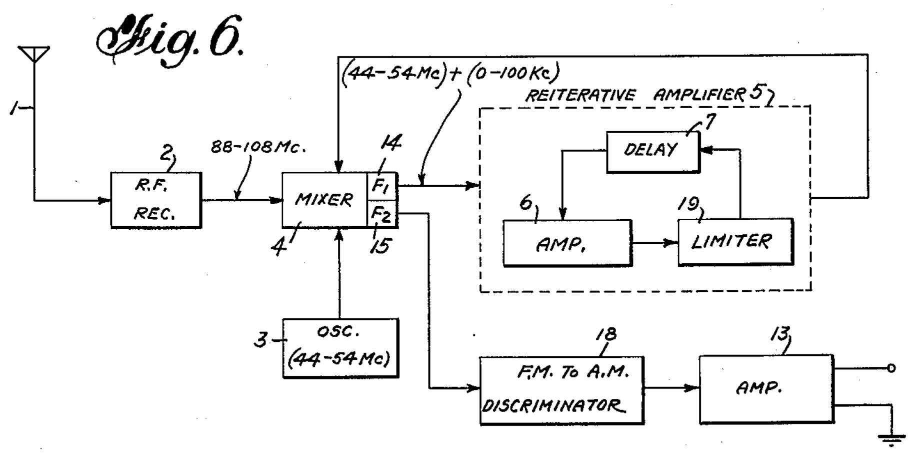
Fig. 6 is a block diagram of another form of the receiver as used for the reception of frequency modulated radiation.

The receiver for handling a frequency modulated input which is shown in Fig. 6 incorporates generally the same elements as the preceding circuits particularly that of Fig. 2 with the inclusion of a frequency modulation to an amplitude modulation discriminator 18 between the mixer 4 and the audio amplifier 13. There is also provided an amplitude limiter 19 so as to maintain the required uniformity in amplitude.

Figure 7:
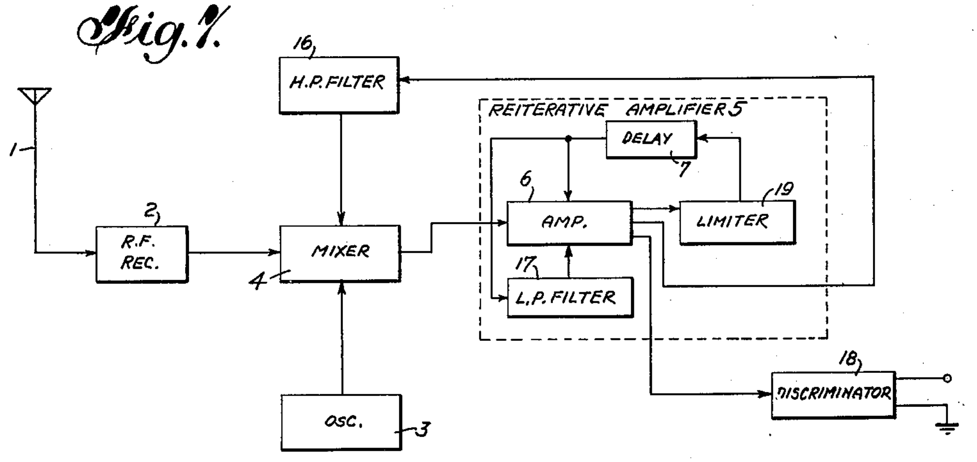
Fig. 7 is a diagram in block form of a modified form of a frequency modulation receiver.

The circuit of Fig. 7 is an adaptation of circuits shown in Fig. 6 and Fig. 5 for handling frequency modulation input and utilizing the reiterative circuit both as an intermediate and an audio amplifier feeding into the discriminator 18.

It will be apparent from the above to those skilled in the art that by the employment of suitable biasing controls for the recycling amplifier in combination with appropriate filtering circuits for the selection of the output frequencies to be recycled, the amplifier may be made to assume the functions of an intermediate and audio frequency amplifier in accordance with the above description. Thus a practical method has been disclosed for obtaining high selectivity for so called "One Tube" receivers for use in the broadcast band or other commercial frequencies.

Other forms of modulation such as the various pulse modulations transmitted through the medium of radio frequency carrier may of course be used with the above-described receivers. It will also be apparent that by the proper introduction of bias controls, frequency component selecting filters and suitable demodulators, various forms of carrier frequency modulations may be handled with the type of receiver described hereinabove.

Accordingly, while I have described above the principles of my invention in connection with specific apparatus and particular modifications thereof, it is to be clearly understood that this description is made only by way of example and not as a limitation as to the scope of my invention which is set forth in the appended claims.

I claim:

1. An arrangement for translating pulse signals of a given duration and time spacing and comprising waves of a given carrier frequency containing modulation components, comprising a source of local waves of a frequency half the frequency of said carrier waves, a mixer circuit for completely mixing said local waves and signal waves to produce an intermediate frequency wave containing said modulation components, a reiterative amplifier for reiteratively amplifying said intermediate frequency waves at a rate higher than the frequency of said modulation components comprising an amplifying device, a feedback circuit coupling the output of said amplifying device to its input, a delay device in said feedback circuit for delaying the energy fed back, and a biasing device coupled to said amplifying device for blocking it after a predetermined number of reiterations, means for applying the output of said amplifier for further mixing with said local waves to produce said modulation components, and a discriminator for said modulation components coupled to said mixer circuit for obtaining said modulation components.

2. An arrangement according to claim 1, wherein said modulation components comprise amplitude modulation components and said discriminator comprises a filter circuit for passing substantially only waves of the frequency of said modulation components.

3. An arrangement according to claim 1, wherein said modulation components comprise frequency modulation components, the output of said mixer circuit comprising differently tuned filter circuits for passing respective mixer outputs and said discriminator comprises a frequency modulation discriminator for passing said modulation components.

4. An arrangement according to claim 1, wherein said mixer comprises means for passing only single sidebands produced in the amplifier.

ROBERT S. BAILEY.

REFERENCES CITED

The following references are of record in the file of this patent:

UNITED STATES PATENTS

| Number | Name | Date |
|---|---|---|
| 1,514,752 | Wold | Nov. 11, 1924 |
| 1,657,451 | Affel | Jan. 31, 1929 |
| 1,730,605 | Farrington | Oct. 8, 1929 |
| 2,134,677 | Vreeland | Oct. 25, 1938 |
| 2,412,995 | Levy | Dec. 24, 1946 |

OTHER REFERENCES

Testing Repeaters with Circulated Pulses, by Beck and Ring, Proc. I. R. E. November 1947, pages 1226–1230.